June 9, 1925.
T. L. LILLY
HINGE
Filed Sept. 16, 1922
1,541,723
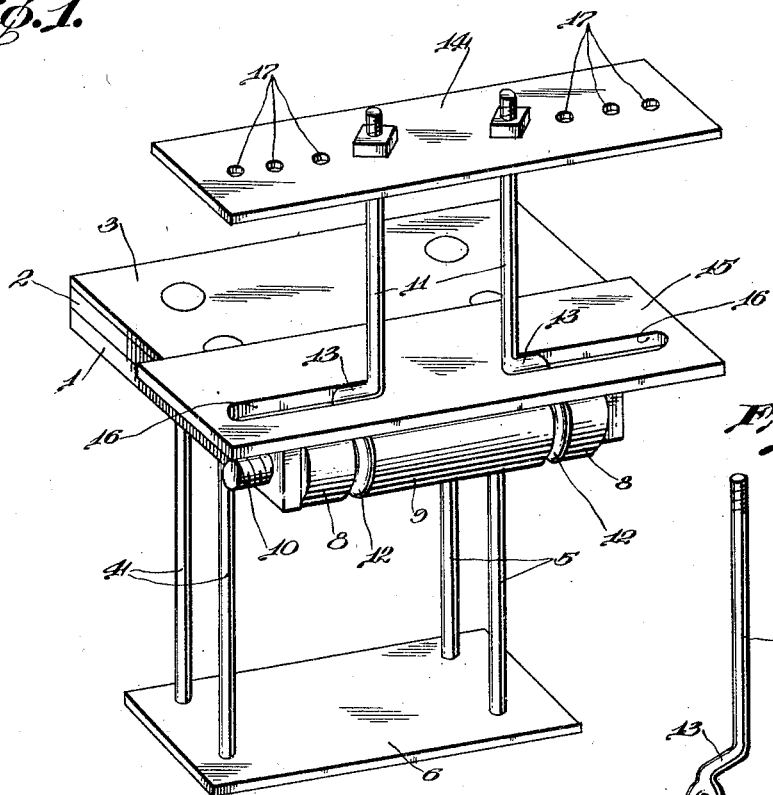
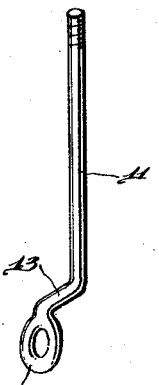
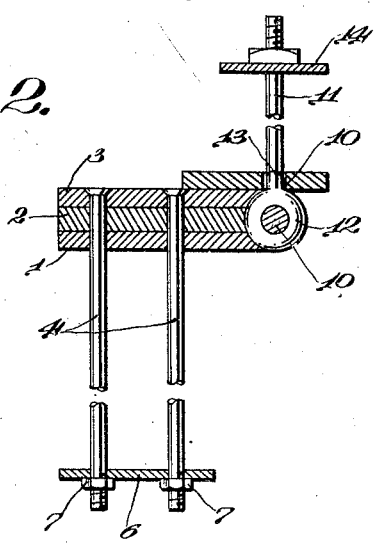
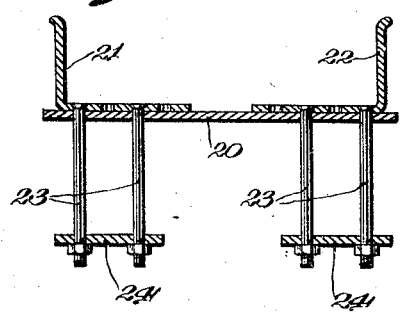
Thomas L. Lilly
INVENTOR
BY Victor J. Evans
ATTORNEY Patented June 9, 1925.

1,541,723

UNITED STATES PATENT OFFICE.

THOMAS L. LILLY, OF MINONK, ILLINOIS.

HINGE.

Application filed September 16, 1922. Serial No. 588,677.

*To all whom it may concern:*

Be it known that I, THOMAS L. LILLY, a citizen of the United States, residing at Minonk, in the county of Woodford and State of Illinois, have invented new and useful Improvements in Hinges, of which the following is a specification.

This invention relates to hinges, and more particularly to hinges designed for use in connection with motor truck bodies, and an object of the invention is to provide a hinge and attaching structure therefor which will clamp about the frame of a motor truck chassis and about the sills of a motor truck body, eliminating the necessity of boring or drilling holes in either of the frame of the chassis or the sills of the motor truck body.

Another object of this invention is to provide a hinge structure which is designed so that it will relieve the pintle bolt of the hinge from carrying the weight either when the load of the truck body is in its normal, loaded, or when it is in its dumping position, the said hinge embodying a suitable plate structure through which the load is distributed to the hinge body when the load is in normal carrying position, and it includes a novel form of bearing structure which supports the load when the truck body is in dumping position, thereby relieving the pintle of the hinge from strain or stress and consequently eliminating liability of distortion or breaking of the hinge.

Another object of this invention is to provide a hinge structure the use of which will eliminate the need of a subframe such as used in various approved types of dumping truck bodies, consequently eliminating the need of drilling and weakening the motor truck chassis and truck body.

Other objects of the invention will appear in the following detailed description taken in connection with the accompanying drawings wherein:

Fig. 1 is a perspective view of the improved hinge.

Fig. 2 is a vertical section through the hinge.

Fig. 3 is a detail perspective view of a bolt used in the hinge construction.

Fig. 4 is a detail section through the supporting structure for the front end of a truck body or bed and adapted for use in connection with the improved hinge.

Referring more particularly to the drawings, the hinge structure comprises main supporting plates 1 and 2, which have a bearing or resting plate 3 connected thereto and resting upon the upper surface of the plate 2. The plates 1, 2 and 3 are adapted for attachment to the frame of a truck chassis by means of pairs 4 and 5 of clamping bolts, and the clamping plate 6. The clamping plate 6 is adjustably mounted upon the pairs of bolts 4 and 5 and is adapted to be moved into clamping engagement with the under surface of the frame of a vehicle chassis by means of adjustment of the nuts 7 for securely clamping the frame between the facing surfaces of the plates 1 and 6.

The plates 1 and 2 have a pintle barrel 9 formed thereon through which the pintle bolt 10 of the hinge structure extends. Pintle collars 8 are mounted upon the pintle bolt 10. Hinge bolts 11 are provided which have eyes 12 formed on their lower ends through which eyes the pintle bolt 10 extends, as clearly shown in Figs. 1 and 2 of the drawings. The bolts 11 are bent horizontally and extend transversely from the eyes 12 parallel to the axis of the eyes as shown at 13 and from the outer terminals of the horizontally bent portions 13 the bolts 11 extend vertically through a clamping plate 14 which is adapted to be clamped against the upper edge of one of the sills of the body of a vehicle truck, while a second clamping plate 15 is provided for clamping engagement against the under surface of the sill. The clamping plate 15 is provided with slots 16 in which the angled portions 13 rest, and the adjustable clamping plate 14 is provided with sets of openings 17 each set comprising a plurality of openings for receiving the bolts 11 therethrough. By angling the bolts 11, that is, by providing the horizontal portions 13, the bolts may be adjustable, relative to the distance between the bolts for engagement with various sized sills. If it is so desired, the eyes 12 may be placed against the outer ends of the collars 8 and reversed from the position shown in Fig. 1 of the drawings which will position the bolts at the outer edges of the plates 1, 2 and 3 and through the outermost openings 17 of each set, providing a maximum width between the bolts. Or the bolts either one or both of them may be reversed from the position shown in Fig. 1, keeping the eyes between the facing ends of the pintle barrel 9 and collars 8, and inserting the bolts through the corresponding openings 17. There are several relative adjustments of the bolts which may be made to properly fit the sills of the truck body upon which the improved hinge is to be used.

It will be noted, that when a truck body is in its normal carrying position, the load will be delivered through the plate 15 to the plates 1, 2 and 3 and through these plates to the frame of the chassis of the vehicle equipped with the improved hinge structure and when the body is tilted into dumping position, the load is distributed to the collars 8 and barrel 9 through the plate 15 thereby relieving the pintle bolt of the weight and strain of the load.

In Fig. 4 of the drawings, the supporting structure is shown for use in connection with the improved hinge and designed for supporting the front end of the body or bed of the vehicle. This structure comprises a resting plate 20 upon which a pair of bracket plates 21 and 22 are adjustably mounted to permit their adjustment laterally of the resting plate 20 and transversely of the frame of a vehicle chassis equipped with the improved hinge. The resting plate 20 and the bracket plate 21 are connected to the frame of the vehicle chassis by means of clamping bolts 23, arranged in pairs and each pair of which cooperates with a clamping plate 24. The provision of the clamping bolts 23 permits adjustment of the clamping plate longitudinally of the frame of the chassis which in cooperation with the lateral adjustment permitted by the brackets 21 will adapt the front end support for use on truck bodies of various sizes.

The pairs of bolts 4 and 5 also permit adjustment of the hinge longitudinally of the chassis frame.

It is, of course, to be understood that the invention may be constructed in other manners and the parts associated in different relations and, therefore, I do not desire to be limited in any manner except as set forth in the claims hereunto appended.

Having thus described my invention what I claim is:

1. In a device as set forth, supporting plates, means for adjustably connecting said supporting plates to the frame of a vehicle chassis, a pintle bolt supported by said plates, hinge bolts adjustably mounted upon said pintle bolt, means for preventing accidental adjustment of said hinge bolt along said pintle bolt, a clamping plate resting upon said first named plates and provided with slots through which said hinge bolts extend, and a second clamping plate adjustably mounted upon said hinge bolts.

2. In a device as set forth, supporting plates, means for adjustably connecting said supporting plates to the frame of a vehicle chassis, a pintle bolt supported by said plates, hinge bolts adjustably mounted upon said pintle bolt, means for preventing accidental adjustment of said hinge bolt along said pintle bolt, a clamping plate resting upon said first named plates and provided with slots through which said hinge bolts extend, and a second clamping plate adjustably mounted upon said hinge bolts, said hinge bolts provided with horizontal portions intermediate their ends to provide a wide range of adjustment of the distances between the bolts.

3. In a device as set forth, a pintle bolt, supporting members therefor, means for adjustably connecting said supporting members to a vehicle chassis frame, hinge bolts provided with eyes pivotally mounted upon said pintle bolt, said hinge bolts provided with transversely extending horizontal portions along said eyes and with vertical portions rising from said horizontal portions, a clamping plate adjustably carried by said hinge bolts, and a second clamping plate provided with slots for receiving the horizontal portions of said hinge bolts.

4. In a device as set forth, supporting plates, means for adjustably connecting said supporting plates to the frame of a vehicle chassis, a pintle bolt supported by said plates, hinge bolts adjustably mounted upon said pintle bolt, means for preventing accidental adjustment of said hinge bolt along said pintle bolt, a clamping plate resting upon said first named plates and provided with slots through which said hinge bolts extend.

In testimony whereof I affix my signature.

THOMAS L. LILLY.